(12) United States Patent
Jurng et al.

(10) Patent No.: US 8,940,240 B2
(45) Date of Patent: Jan. 27, 2015

(54) APPARATUS AND METHOD FOR MANUFACTURING COMPOSITE NANO PARTICLES

(71) Applicants: Jong Soo Jurng, Seoul (KR); Eun Seuk Park, Seongnam-si (KR); Sung Min Chin, Uijeongbu-si (KR); Min Su Kim, Jeonju-si (KR)

(72) Inventors: Jong Soo Jurng, Seoul (KR); Eun Seuk Park, Seongnam-si (KR); Sung Min Chin, Uijeongbu-si (KR); Min Su Kim, Jeonju-si (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 13/756,569

(22) Filed: Feb. 1, 2013

(65) Prior Publication Data
US 2013/0209352 A1 Aug. 15, 2013

(30) Foreign Application Priority Data

Feb. 15, 2012 (KR) .................. 10-2012-0015199

(51) Int. Cl.
*B01J 12/02* (2006.01)
*B01J 19/24* (2006.01)
*B01J 4/00* (2006.01)
B82Y 30/00 (2011.01)
B82Y 40/00 (2011.01)

(52) U.S. Cl.
CPC .............. *B01J 12/02* (2013.01); *Y10S 977/896* (2013.01); *B82Y 40/00* (2013.01); *B01J 19/243* (2013.01); *B01J 4/008* (2013.01); *B01J 2219/00094* (2013.01); *B01J 2219/00135* (2013.01); *Y10S 977/773* (2013.01)
USPC ............ 422/129; 422/198; 977/773; 977/896

(58) Field of Classification Search
None
See application file for complete search history.

(56) References Cited

U.S. PATENT DOCUMENTS 4,120,941 A * 10/1978 Nowak et al. ............... 423/592.1
4,532,224 A * 7/1985 Hori ............................. 501/105
(Continued)

FOREIGN PATENT DOCUMENTS

JP  2005-289798  10/2005
JP  2007-024403  2/2007
(Continued)

OTHER PUBLICATIONS

Cho, W. et al. "Intraparticle structures of composite TiO2/SiO2 nanoparticles prepared by varying precursor mixing modes in vapor phase," Journal of Materials Science, vol. 38, pp. 2619-2625, 2003 (7 pages, in English)
(Continued)

*Primary Examiner* — Jennifer A Leung
(74) *Attorney, Agent, or Firm* — NSIP Law (57) ABSTRACT

Disclosed are an apparatus and a method for manufacturing composite nanoparticles. The apparatus comprises: a first precursor supply unit vaporizing a first precursor and supplying it to a reaction unit; a second precursor supply unit vaporizing a second precursor and supplying it to the reaction unit; the reaction unit producing composite nanoparticles by reacting the vaporized first precursor with the vaporized second precursor; an oxygen supply line supplying an oxygen source to the reaction unit; and a collection unit collecting the composite nanoparticles produced by the reaction unit. Since gas phase synthesis occurs in different stages using the U-shaped reaction chamber, aggregation is prevented and composite nanoparticles of uniform size and high specific surface area can be produced easily.

8 Claims, 5 Drawing Sheets

(56) References Cited

U.S. PATENT DOCUMENTS

| | | | |
|---|---|---|---|
| 4,591,471 A * | 5/1986 | Hori | 427/215 |
| 4,746,638 A * | 5/1988 | Hori et al. | 501/127 |
| 6,702,957 B2 * | 3/2004 | Konrad et al. | 252/301.4 R |
| 7,527,824 B2 * | 5/2009 | Becker et al. | 427/212 |
| 8,052,958 B2 * | 11/2011 | Lee et al. | 423/632 |
| 8,703,060 B2 * | 4/2014 | Hsu et al. | 422/78 |
| 2006/0147713 A1 * | 7/2006 | Tanaka et al. | 428/402 |
| 2006/0165910 A1 * | 7/2006 | Kodas et al. | 427/446 |
| 2010/0098620 A1 * | 4/2010 | Ohtani et al. | 423/609 |
| 2010/0209334 A1 * | 8/2010 | Kuroda et al. | 423/608 |
| 2010/0266486 A1 | 10/2010 | Put et al. | |
| 2010/0304143 A1 * | 12/2010 | Seeber et al. | 428/404 |
| 2011/0259834 A1 * | 10/2011 | Lee | 210/749 |
| 2014/0004027 A1 * | 1/2014 | Jurng et al. | 423/239.1 |
| 2014/0018237 A1 * | 1/2014 | Jurng et al. | 502/350 |
| 2014/0206529 A1 * | 7/2014 | Jurng et al. | 502/242 |

FOREIGN PATENT DOCUMENTS

| | | |
|---|---|---|
| KR | 10-0480393 | 6/2004 |
| KR | 10-0589203 | 6/2006 |
| KR | 10-2006-0112546 | 11/2006 |
| KR | 10-2006-0118818 | 11/2006 |
| KR | 10-0658113 | 11/2006 |
| KR | 10-2007-0017408 | 2/2007 |
| KR | 10-2009-0057262 | 6/2009 |
| KR | 10-2009-0109967 | 10/2009 |
| KR | 10-2010-0021871 | 2/2010 |

OTHER PUBLICATIONS

Zhang, Xingwang et al. "Preparation of anatase TiO2 supported on alumina by different metal organic chemical vapor deposition methods," Applied Catalysis A: General, vol. 282, pp. 285-293, 2005 (9 pages, in English).

Park, Eunseuk et al. "Preparation of MnOx/TiO2 ultrafine nanocomposite with large surface area and its enhanced toluene oxidation at low temperature," Powder Technology, vol. 208, pp. 740-743, 2011 (4 pages, in English).

* cited by examiner

APPARATUS AND METHOD FOR MANUFACTURING COMPOSITE NANO PARTICLES

CROSS-REFERENCE TO RELATED APPLICATION

This application claims priority to Korean Patent Application No. 10-2012-0015199, filed on Feb. 15, 2012, and all the benefits accruing therefrom under 35 U.S.C. §119, the contents of which in its entirety are herein incorporated by reference.

BACKGROUND

1. Field

The present disclosure relates to an apparatus and a method for manufacturing composite nanoparticles. More particularly, it relates to an apparatus and a method for manufacturing composite nanoparticles allowing manufacturing of composite nanoparticles of uniform size and high specific surface area without aggregation by performing gas phase synthesis in different stages using a U-shaped reaction chamber.

2. Description of the Related Art

Nanoparticles generally refer to fine particles sized between 1 nm and 100 nm. These nanoparticles have superior properties such as remarkably increased specific surface area, light weight, high strength, high toughness, etc. as compared to other materials. For this reason, the nanoparticles have enhanced surface activity as well as improved sinterability, thermal conductivity, etc.

Owing to the many advantages described above, the nanoparticles are widely studied and used in various fields, comprising ecology, energy, electronics, biology, and so forth. Recently, researches on composite nanoparticles synthesized from two or more different materials are carried out actively.

The methods for synthesizing nanoparticles may be classified into physical and chemical processes. In general, a wet method whereby an electric field or a laser is applied to an aqueous solution in which a precursor material is dispersed or another precursor material is added thereto is employed. Also, a technique of preparing nanoparticles by condensing molecules at a critical point of high temperature and pressure has been presented. For example, Korean Patent Publication No. 10-2009-0057262 discloses a wet method of synthesizing composite nanoparticles by hydrothermally treating amorphous hydrated metal oxide in the presence of titanium dioxide nanoparticles.

However, the existing wet method is problematic in that the manufacturing process is complicated and the control of particle shape, particle aggregation, pH, reaction temperature, reaction time, etc. is restricted, so highly advanced technology is required.

Accordingly, a gas phase synthesis method of vaporizing precursor materials at vapor pressure and synthesizing nanoparticles via interparticle collision in a high-temperature reactor is drawing attentions recently as an alternative to the wet method (solution method). This gas phase synthesis method is advantageous in that the selection of composition is widened since reaction with various gases can be used, the manufacturing process is simple and uniform nanoparticles can be synthesized with high purity.

For example, Korean Patent No. 10-0658113 discloses a process of synthesizing iron nanopowder coated with silica ($SiO_2$) by chemical vapor condensation, Korean Patent Publication No. 10-2007-0017408 discloses an apparatus for producing nanoparticles by gas phase synthesis wherein heating units containing respective precursor materials are provided inside a reaction chamber, and Korean Patent Publication No. 10-2009-0109967 discloses a method and an apparatus for manufacturing aluminum nitride particles by gas phase synthesis by vaporizing precursor materials and introducing them into a reaction chamber.

In addition, the literature 'Intraparticle structures of composite $TiO_2/SiO_2$ nanoparticles prepared by varying precursor mixing modes in vapor phase' (*Journal of Materials Science*, Vol. 38, pp. 2619-2625, 2003) discloses a method of manufacturing a titania-silicon nanocomposite catalyst at high temperature by gas phase synthesis after inducing vaporization of precursor materials by applying vacuum inside a reactor. The literature 'Preparation of anatase $TiO_2$ supported on alumina by different metal organic chemical vapor deposition methods' (*Applied Catalysis A: General*, Vol. 282, pp. 285-293, 2005) also discloses a technique of synthesizing titania-alumina nanoparticles from precursor materials using a high-temperature reactor.

However, the existing methods have the problem that, since the respective vaporized precursors are supplied to the reaction chamber through the same inlet, specific surface area of the nanoparticles decreases due to interparticle aggregation. Furthermore, the synthesized composite nanoparticles have low dispersity and large size. In addition, due to the restricted rate of supplying the precursors, a precise control is required and it is difficult to produce high-purity composite nanoparticles on a commercial scale.

REFERENCES OF THE RELATED ART

Patent Documents

Korean Patent Publication No. 10-2009-0057262
Korean Patent No. 10-0658113
Korean Patent Publication No. 10-2007-0017408
Korean Patent Publication No. 10-2009-0109967

Non-Patent Documents

'Intraparticle structures of composite $TiO_2/SiO_2$ nanoparticles prepared by varying precursor mixing modes in vapor phase' (Journal of Materials Science, Volume 38, pages 2619-2625, 2003)

'Preparation of anatase $TiO_2$ supported on alumina by different metal organic chemical vapor deposition methods' (Applied Catalysis A: General, Volume 282, pages 285-293, 2005)

SUMMARY

The present disclosure is directed to providing an apparatus and a method for manufacturing composite nanoparticles allowing manufacturing of composite nanoparticles of uniform size and high specific surface area without aggregation by performing gas phase synthesis in different stages using a U-shaped reaction chamber.

In one aspect, there is provided an apparatus for manufacturing composite nanoparticles, comprising:

a first precursor supply unit vaporizing a first precursor and supplying it to a reaction unit;

a second precursor supply unit vaporizing a second precursor and supplying it to the reaction unit;

the reaction unit producing composite nanoparticles by reacting the vaporized first precursor with the vaporized second precursor;

an oxygen supply line supplying an oxygen source to the reaction unit; and a collection unit collecting the composite nanoparticles produced by the reaction unit, wherein the reaction unit comprises:

a U-shaped reaction chamber having: a first straight flow path wherein nanoparticles are produced from the vaporized first precursor supplied from the first precursor supply unit; a curved flow path which is communicated with the first straight flow path and allows the nanoparticles produced from the first straight flow path to be introduced to a second straight flow path with a curved flow; and the second straight flow path which is communicated with the curved flow path and wherein the composite nanoparticles are produced from the reaction of the nanoparticles of the first precursor introduced from the curved flow path and the vaporized second precursor supplied from the second precursor supply unit;

a second precursor inflow path introducing the vaporized second precursor supplied from the second precursor supply unit to the second straight flow path of the U-shaped reaction chamber; and a heat supply means supplying heat to the U-shaped reaction chamber.

The first precursor supply unit may comprise: a first vaporization tank vaporizing the first precursor; a first precursor supply pipe transferring and supplying the vaporized first precursor vaporized by the first vaporization tank to the first straight flow path; and a carrier gas injection line injecting a carrier gas to the first vaporization tank.

And, the second precursor supply unit may comprise: a second vaporization tank vaporizing the second precursor; a second precursor supply pipe transferring and supplying the vaporized second precursor vaporized by the second vaporization tank to the second straight flow path; and a carrier gas injection line injecting a carrier gas to the second vaporization tank.

And, the oxygen supply line may comprise: a storage tank storing the oxygen source; and a transfer pipe transferring the oxygen source stored in the storage tank, the transfer pipe being connected to the first precursor supply pipe.

In another aspect, there is provided a method for manufacturing composite nanoparticles, comprising:

vaporizing a first precursor and a second precursor;

producing composite nanoparticles by reacting the vaporized first precursor with the vaporized second precursor; and collecting the composite nanoparticles, wherein the reacting the vaporized first precursor with the vaporized second precursor comprises, using a U-shaped reaction chamber having a first straight flow path, a curved flow path communicated with the first straight flow path and a second straight flow path communicated with the curved flow path, producing nanoparticles of the first precursor by supplying the vaporized first precursor to the first straight flow path, introducing the nanoparticles of the first precursor to the second straight flow path with a curved flow by passing through the curved flow path, and producing the composite nanoparticles by supplying the vaporized second precursor to the second straight flow path.

Specifically, the method for manufacturing composite nanoparticles according to the present disclosure may be embodied using the apparatus according to the present disclosure described above.

In accordance with the present disclosure, since gas phase synthesis occurs in different stages using the U-shaped reaction chamber, aggregation is prevented and composite nanoparticles of uniform size and high specific surface area may be produced easily.

BRIEF DESCRIPTION OF THE DRAWINGS

The above and other aspects, features and advantages of the disclosed exemplary embodiments will be more apparent from the following detailed description taken in conjunction with the accompanying drawings in which.

[Detailed Description of Main Elements]

| | |
|---|---|
| 100: first precursor supply unit | 120: first vaporization tank |
| 140: first precursor supply pipe | 160, 260: carrier gas injection line |
| 200: second precursor supply unit | 220: second vaporization tank |
| 240: second precursor supply pipe | 300: reaction unit |
| 310: U-shaped reaction chamber | 312: first straight flow path |
| 314: curved flow path | 316: second straight flow path |
| 320: second precursor inflow path | 330: heat supply means |
| 400: oxygen supply line | 500: collection unit |
| 510: cooling device | 512: outer pipe |
| 514: inner pipe | 514a: vortex generation unit |

DETAILED DESCRIPTION

In the present disclosure, composite nanoparticles refer to composite materials of two or more different materials having nanometer (nm) size. For example, the composite nanoparticles may have a size of not greater than 100 nm. Specifically, the composite nanoparticles manufactured according to the present disclosure may have an ultrafine particle size of not greater than 20 nm, more specifically 0.1-20 nm. The shape of the composite nanoparticles manufactured according to the present disclosure is not particularly limited. For example, they may have a spherical shape but the shape is not particularly limited thereto.

The composite nanoparticles according to the present disclosure comprise two or more different materials and comprise those wherein two or more particles of different materials are mixed or bound, those wherein two or more different materials are crystallized to nanoscale size, those wherein a material is coated on another material, and so forth.

When the composite nanoparticles comprise two materials, they may be selected, for example, from metal-metal, metal-metal oxide, metal oxide-metal oxide, metal-nitride, metal oxide-nitride, etc. The metal is not particularly limited and may be selected, for example, from manganese (Mn), titanium (Ti), nickel (Ni), aluminum (Al), iron (Fe), silicon (Si), chromium (Cr), zirconium (Zr), tungsten (W), molybdenum (Mo), indium (In), rhodium (Rh), selenium (Se), cesium (Cs), etc. More specifically, the composite nanoparticles may be selected, for example, from manganese oxide-titania ($MnO_x$—$TiO_x$), manganese oxide-silica ($MnO_x$—$SiO_x$), titania-silica ($TiO_x$—$SiO_x$), alumina-titania ($Al_xO_x$—$TiO_x$), silica-nitride ($SiO_x$—N), silica-iron ($SiO_x$—Fe), silicon nitride (N—Si), etc. (x is not particularly limited and may be, for example, $0 < x \le 3$.)

In the present disclosure, the first precursor and the second precursor are not particularly limited as long as they are different materials and can be used as sources (starting materials) for synthesizing (producing) the composite nanoparticles. They may be selected from various materials. For example, the first precursor and the second precursor may be independently selected from a metal, a metal salt, an organometal, an inorganic material, an organic-inorganic hybrid material, etc.

Figure 1:
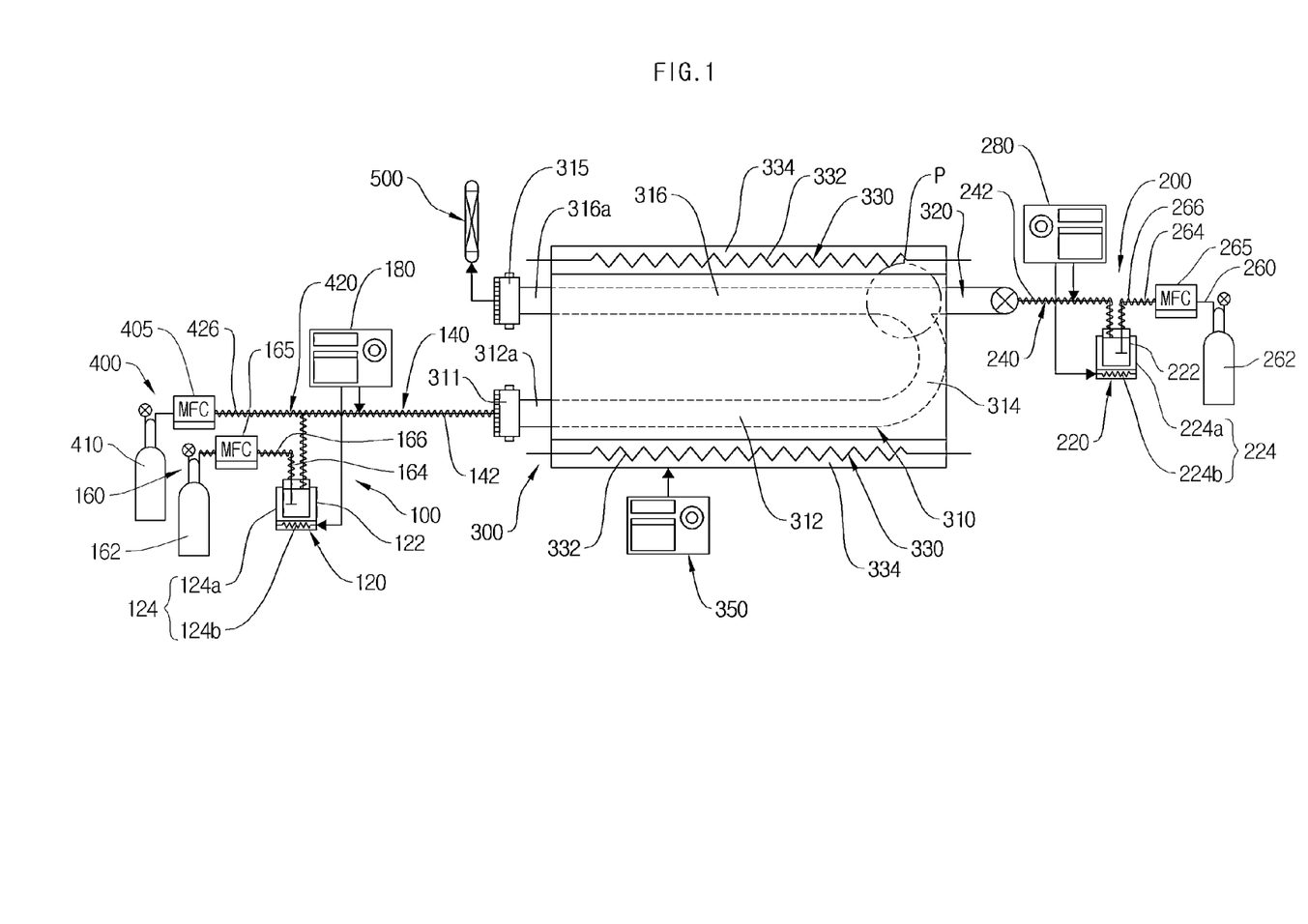
FIG. 1 shows the configuration of an apparatus for manufacturing composite nanoparticles according to an exemplary embodiment of the present disclosure.
Figure 2:
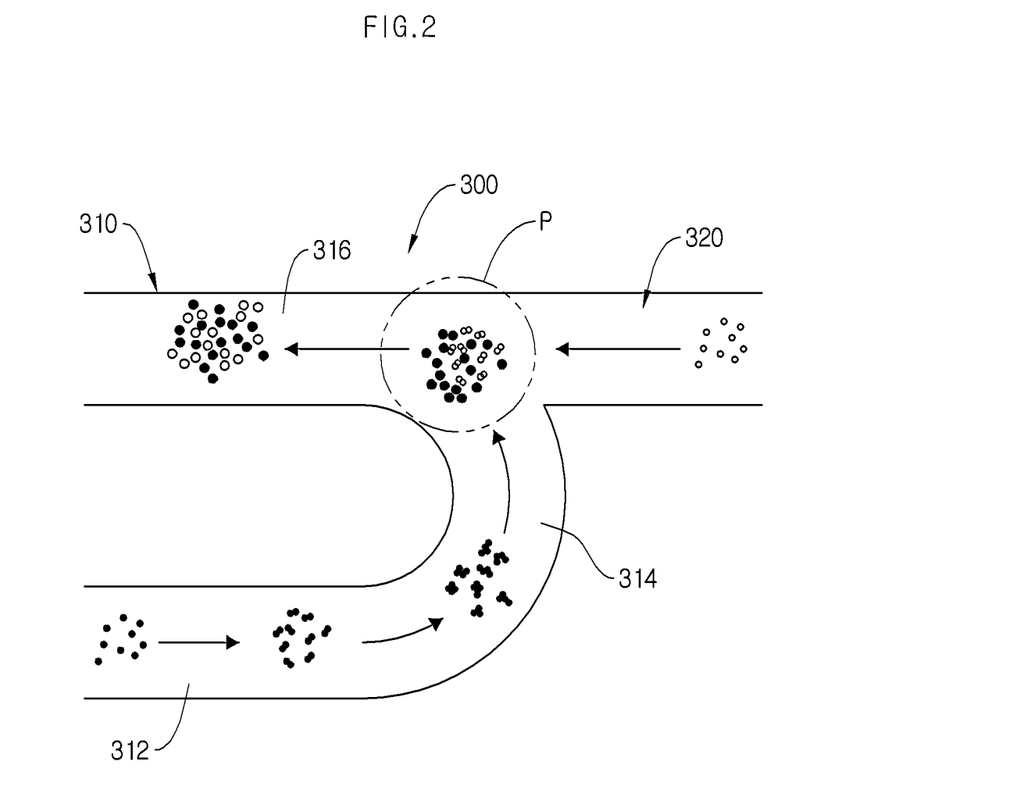
FIG. 2 shows the configuration of a portion of the apparatus shown in FIG. 1.

Hereinafter, the present disclosure will be described in detail referring to the attached drawings. The configuration of an apparatus for manufacturing composite nanoparticles according to the present disclosure will be described first, and then a method for manufacturing composite nanoparticles according to the present disclosure will be described. FIG. 1 shows the configuration of an apparatus for manufacturing composite nanoparticles according to an exemplary embodiment of the present disclosure and FIG. 2 shows the configuration of a portion of the apparatus shown in FIG. 1 where the composite nanoparticles are synthesized.

First, referring to FIG. 1, an apparatus for manufacturing composite nanoparticles according to the present disclosure comprises: a first precursor supply unit 100 vaporizing a first precursor and supplying it to a reaction unit 300; a second precursor supply unit 200 vaporizing a second precursor and supplying it to the reaction unit 300; the reaction unit 300 producing (synthesizing) composite nanoparticles by reacting the vaporized first precursor with the vaporized second precursor; an oxygen supply line 400 supplying an oxygen source to the reaction unit 300; and a collection unit 500 collecting the composite nanoparticles produced (synthesized) by the reaction unit 300.

The first precursor supply unit 100 is not particularly limited as long as it can vaporize the first precursor and supply it to the reaction unit 300. That is to say, the first precursor supply unit 100 produces a vaporized first precursor, transfers and supplies it to the reaction unit 300. The vaporized first precursor may be forcibly transported by a transport means. The transport means may be selected from, for example, a carrier gas, a pump, a blowing fan, etc. Specifically, a carrier gas may be used as described below.

In an exemplary embodiment of the present disclosure, the first precursor supply unit 100 may comprise a first vaporization tank 120 vaporizing the first precursor, a first precursor supply pipe 140 transferring and supplying the vaporized first precursor vaporized by the first vaporization tank 120 to the reaction unit 300 and a carrier gas injection line 160 injecting a carrier gas as a transport means to the first vaporization tank 120.

The first vaporization tank 120 may be configured variously. For example, it may comprise a bubbler 122 wherein the first precursor is held and vaporized and a heat source 124 which supplies heat to the bubbler 122.

The bubbler 122 may have various shapes such as cylindrical or polyhedral shape. A plate may be disposed in the bubbler 122 and the plate may comprise one or more stages.

The heat source 124 is not particularly limited as long as it can supply heat to the bubbler 122. The heat source 124 may be selected from, for example, a heating wire generating heat by receiving electrical power, a band heater, or the like. The heat source 124 which may be a heating wire, a band heater, etc. may be wound around the bubbler 122 or may be disposed inside the bubbler 122.

Specifically, the heat source 124 may comprise an oil bath maintaining high-temperature heat. More specifically, the heat source 124 may comprise an oil bath 124a holding an oil and a heating means 124b heating the oil. As shown in FIG. 1, a heating wire may be used as the heating means 124b. When an oil bath 124a holding a hot oil is used as the heat source 124 supplying heat to the bubbler 122, rapid heating of the bubbler 122 may be prevented and heat may be supplied uniformly to the bubbler 122.

The vaporized first precursor produced by the first vaporization tank 120 is supplied to the reaction unit 300 along the first precursor supply pipe 140. One end of the first precursor supply pipe 140 is connected to the first vaporization tank 120 and the other end is connected to the reaction unit 300. More specifically, one end of the first precursor supply pipe 140 is connected to the bubbler 122 of the first vaporization tank 120 and the other end is connected to a first straight flow path 312 of the reaction unit 300.

In an exemplary embodiment, a constant temperature maintaining means 142 preventing condensation may be provided at the first precursor supply pipe 140. The constant temperature maintaining means 142 may prevent condensation of the vaporized first precursor while it is supplied along the supply pipe 140. The constant temperature maintaining means 142 may be selected from, for example, a thermal insulator, a heating wire, a band heater, etc. provided around the first precursor supply pipe 140 as a heat-insulating or heating means.

The carrier gas injection line 160 injects the carrier gas to the first vaporization tank 120. The carrier gas serves as a carrier of the vaporized first precursor vaporized by the first vaporization tank 120 such that it can be easily supplied to the reaction unit 300. Specifically, the vaporized first precursor produced by the first vaporization tank 120 is supplied along the first precursor supply pipe 140 as carried by the carrier gas to the reaction unit 300.

The carrier gas injection line 160 is not particularly limited as long as it can inject the carrier gas to the first vaporization tank 120. For example, it may comprise a bombe 162 storing the carrier gas and an injection pipe 164 providing a flow path through which the carrier gas stored in the bombe 162 is supplied to the first vaporization tank 120. One end of the injection pipe 164 is connected to the bombe 162 and the other end is connected to the bubbler 122 of the first vaporization tank 120.

The carrier gas is not particularly limited as long as it can carry the vaporized first precursor. Although not being particularly limited thereto, the carrier gas may be one or more selected from a group consisting of argon (Ar), nitrogen ($N_2$), helium (He), oxygen ($O_2$) and air.

Further, the carrier gas injection line 160 may comprise a mass flow controller (MFC) 165 controlling the injection rate of the carrier gas. As shown in FIG. 1, the MFC 165 may be provided on the injection pipe 164. The supply rate of the vaporized first precursor supplied to the reaction unit 300 may be controlled by the injection rate of the carrier gas. In another exemplary embodiment, the supply rate of the vaporized first precursor may be controlled by providing a mass flow controller (not shown) on the first precursor supply pipe 140.

The carrier gas may be maintained at an appropriate temperature. If the carrier gas is injected to the first vaporization tank 120 at too low a temperature, the vaporized first precursor may be condensed in the first vaporization tank 120 to form a liquid mist. Thus, the carrier gas may be maintained at a temperature almost the same as that of the vaporized first precursor in the first vaporization tank 120. For this, the carrier gas injection line 160 may further comprise a heat-insulating or heating means. For example, a heat-insulating or heating means may be provided at the bombe 162. Specifically, the heat-insulating or heating means may be provided at the injection pipe 164 through which the carrier gas flows and the heat-insulating or heating means may be selected from a thermal insulator, a heating wire, a band heater, etc. In FIG. 1, a heating wire 166 provided at the injection pipe 164 is shown as the heating means.

The first precursor supply unit 100 may further comprise a temperature controller 180. The temperature controller 180 may control at least the heat source 124 of the first vaporization tank 120 so that heat is appropriately supplied to the bubbler 122. The temperature of the heat source 124 controlled by the temperature controller 180 may be different depending on the identity of the first precursor. The temperature of the heat source 124 may be set according to the boiling point of the first precursor. For example, it may be controlled to 80-110° C. In addition to controlling the temperature of the first vaporization tank 120, the temperature controller 180 may also control the temperature of the vaporized first precursor and/or the temperature of the carrier gas flowing through the first precursor supply pipe 140. That is to say, the temperature controller 180 may control the temperature of the constant temperature maintaining means 142 provided on the first precursor supply pipe 140 and/or the temperature of the heating wire 166 provided on the carrier gas injection pipe 164.

The second precursor supply unit 200 is not particularly limited as long as it can vaporize the second precursor and supply it to the reaction unit 300. That is to say, the second precursor supply unit 200 produces the vaporized second precursor and supplies it to the reaction unit 300. The vaporized second precursor may be supplied to the reaction unit 300 by a transport means such as a carrier gas, a pump, a blowing fan, etc.

The vaporized first precursor produced by the first precursor supply unit 100 is supplied to the first straight flow path 312 of the reaction unit 300, and the vaporized second precursor produced by the second precursor supply unit 200 is supplied to a second straight flow path 316 of the reaction unit 300. That is to say, the individual vaporized precursors are supplied to the reaction unit 300 in different stages. More specifically, after the vaporized first precursor is supplied first to the first straight flow path 312 (stage 1) such that nanoparticles are produced from the first precursor as it passes through the first straight flow path 312, the vaporized second precursor is supplied to the second straight flow path 316 (stage 2). The nanoparticles of the first precursor join the vaporized second precursor at the second straight flow path 316 and composite nanoparticles are produced therefrom as they pass through the second straight flow path 316.

The second precursor supply unit 200 may be configured identically to the first precursor supply unit 100. Specifically, in an exemplary embodiment of the present disclosure, the second precursor supply unit 200 may comprise a second vaporization tank 220 vaporizing the second precursor, a second precursor supply pipe 240 transferring and supplying the vaporized second precursor vaporized by the second vaporization tank 220 to the reaction unit 300 and a carrier gas injection line 260 injecting a carrier gas as a transport means to the second vaporization tank 220.

The second vaporization tank 220 may be configured variously like the first precursor supply unit 100. It may comprise, for example, a bubbler 222 wherein the second precursor is held and vaporized and a heat source 224 which supplies heat to the bubbler 222. The bubbler 222 may have various shapes such as cylindrical or polyhedral shape. A plate may be disposed in the bubbler 222 and the plate may comprise one or more stages. The heat source 224 is not particularly limited as long as it can supply heat to the bubbler 222. The heat source 224 may be selected from, for example, a heating wire generating heat by receiving electrical power, a band heater, or the like. Specifically, the heat source 224 may comprise an oil bath 224a holding a hot oil. Specifically, the heat source 224 may comprise an oil bath 224a holding an oil and a heating means 224b, e.g. a heating wire, heating the oil.

The vaporized second precursor produced by the second vaporization tank 220 is supplied to the reaction unit 300 along the second precursor supply pipe 240. One end of the second precursor supply pipe 240 is connected to the second vaporization tank 220 and the other end is connected to the reaction unit 300. More specifically, one end of the second precursor supply pipe 240 is connected to the bubbler 222 of the second vaporization tank 220 and the other end is connected to a second precursor inflow path 320 of the reaction unit 300.

A constant temperature maintaining means 242 may be provided at the second precursor supply pipe 240. The constant temperature maintaining means 242 may prevent condensation of the vaporized second precursor while it is supplied along the supply pipe 240. As described above, the constant temperature maintaining means 242 may be selected from, for example, a thermal insulator, a heating wire, a band heater, etc. provided around the second precursor supply pipe 240.

The carrier gas injection line 260 of the second precursor supply unit 200 injects the carrier gas to the second vaporization tank 220. The carrier gas serves as a carrier of the vaporized second precursor vaporized by the second vaporization tank 220 such that it can be easily supplied to the reaction unit 300. Specifically, the vaporized second precursor produced by the second vaporization tank 220 is supplied along the second precursor supply pipe 240 as carried by the carrier gas to the reaction unit 300.

The carrier gas injection line 260 is not particularly limited as long as it can inject the carrier gas to the second vaporization tank 220 as described with respect to the first precursor supply unit 100. For example, it may comprise a bombe 262 storing the carrier gas and an injection pipe 264 providing a flow path through which the carrier gas stored in the bombe 262 is supplied to the second vaporization tank 220. One end of the injection pipe 264 is connected to the bombe 262 and the other end is connected to the bubbler 222 of the second vaporization tank 220. As described above, the carrier gas stored in the bombe 262 may be one or more selected from a group consisting of argon (Ar), nitrogen ($N_2$), helium (He), oxygen ($O_2$) and air.

Further, the carrier gas injection line 260 may comprise a mass flow controller (MFC) 265 controlling the injection rate of the carrier gas. As shown in FIG. 1, the MFC 265 may be provided on the injection pipe 264. The supply rate of the vaporized second precursor supplied to the reaction unit 300 may be controlled by the injection rate of the carrier gas. In another exemplary embodiment, the supply rate of the vaporized second precursor may be controlled by providing a mass flow controller (not shown) on the second precursor supply pipe 240. The carrier gas injection line 260 may further comprise a heat-insulating or heating means. For example, a heat-insulating or heating means may be provided at the bombe 262, specifically at the injection pipe 264 through which the carrier gas flows. The heat-insulating or heating means may be selected from a thermal insulator, a heating wire, a band heater, etc. In FIG. 1, a heating wire 266 provided at the injection pipe 264 is shown as the heating means.

The second precursor supply unit 200 may further comprise a temperature controller 280 as described with respect to the first precursor supply unit 100. The temperature controller 280 may control at least the heat source 224 of the second vaporization tank 220 so that heat is appropriately supplied to the bubbler 222. The temperature of the heat source 224 controlled by the temperature controller 280 may be different depending on the identity of the second precursor. In addition to controlling the temperature of the second vaporization tank 220, the temperature controller 280 may also control the temperature of the vaporized second precursor and/or the temperature of the carrier gas flowing through the second precursor supply pipe 240. That is to say, the temperature controller 280 may control the temperature of the constant temperature maintaining means 242 provided on the second precursor supply pipe 240 and/or the temperature of the heating wire 266 provided on the carrier gas injection pipe 264.

The reaction unit 300 produces the composite nanoparticles from the vaporized first precursor and the vaporized second precursor. The reaction unit 300 comprises a U-shaped reaction chamber 310. Specifically, the reaction unit 300 comprises: the U-shaped reaction chamber 310 which is maintained at high temperature and wherein the composite nanoparticles are synthesized; the second precursor inflow path 320 through which the vaporized second precursor is introduced; and a heat supply means 330 which supplies high-temperature heat to the U-shaped reaction chamber 310.

The U-shaped reaction chamber 310 has the first straight flow path 312, a curved flow path 314 communicating with the first straight flow path 312, and the second straight flow path 316 communicating with the curved flow path 314. Specifically, the U-shaped reaction chamber 310, i.e. the first straight flow path 312, the curved flow path 314 and the second straight flow path 316, may be formed integrally and have the same inner diameter. The U-shaped reaction chamber 310 may be made of, for example, a metal or ceramic material. Specifically, the U-shaped reaction chamber 310 may be selected from an alumina tube, a quartz tube, a mullite tube, or the like. More specifically, it may be an alumina tube.

The first straight flow path 312 produces (synthesizes) the nanoparticles from the vaporized first precursor supplied by the first precursor supply unit 100. That is to say, the vaporized first precursor is synthesized into the nanoparticles as it passes through the first straight flow path 312. For example, when an organometal (e.g., an organotitanium compound) is supplied to the first straight flow path 312 as the vaporized first precursor, it reacts with the oxygen source (e.g., air) supplied from the oxygen supply line 400 at high temperature and is synthesized into metal oxide (e.g., titania) nanoparticles. An inlet 312a of the first straight flow path 312 and the supply pipe 140 of the first precursor supply unit 100 may be hermetically coupled by a coupling means 311 such as a flange.

The curved flow path 314 induces a curved flow of the nanoparticles produced in the first straight flow path 312. That is to say, the curved flow path 314 induces the nanoparticles of the first precursor produced in the first straight flow path 312 to be introduced to the second straight flow path 316 with a curved flow, such that they have the same flow direction (indicated as an arrow in FIG. 1) as the vaporized second precursor at a joining portion P. More specifically, the nanoparticles produced in the first straight flow path 312 and the vaporized second precursor introduced from the second precursor inflow path 320 are joined in the second straight flow path 316. If the nanoparticles of the first precursor and the vaporized second precursor join with an angle (e.g., a right angle) or head on, the synthesis of the composite nanoparticles may be inhibited and the flow in the supply units 100, 200 where the flow rate is relatively slower may be interrupted because deposition may occur inside the reaction chamber 310. The curved flow path 314 prevents such problems and induces the flow direction of the nanoparticles of the first precursor to be the same as that of the vaporized second precursor at the joining portion P, as shown in FIG. 1, thus improving the production efficiency of the composite nanoparticles in the second straight flow path 316.

The second straight flow path 316 produces (synthesizes) the composite nanoparticles by reacting the nanoparticles of the first precursor introduced from the curved flow path 314 with the vaporized second precursor introduced from the second precursor inflow path 320. The composite nanoparticles produced (synthesized) in the second straight flow path 316 are collected by the collection unit 500. An outlet 316a of the second straight flow path 316 and the collection unit 500 may be hermetically coupled by a coupling means 315 such as a flange.

The second precursor inflow path 320 joins the vaporized second precursor supplied from the second precursor supply unit 200 in the second straight flow path 316. That is to say, the flow of the vaporized second precursor produced by the second precursor supply unit 200 is stabilized as it passes through the second precursor inflow path 320. After being joined with the nanoparticles of the first precursor at the joining portion P, the vaporized second precursor passes through the second straight flow path 316. The second precursor inflow path 320 may be maintained at high temperature by the heat supply means 330. And, the second precursor inflow path 320 may have the same inner diameter as that of the second straight flow path 316 such that a vortex does not occur at the joining portion P. The second precursor inflow path 320 may be formed integrally with the second straight flow path 316.

The heat supply means 330 supplies heat at least to the U-shaped reaction chamber 310. More specifically, the heat supply means 330 may supply heat to the first straight flow path 312, the curved flow path 314 and the second straight flow path 316. It may further supply heat to the second precursor inflow path 320.

The heat supply means 330 may be configured variously. The heat supply means 330 is not particularly limited as long as it can supply heat at least to the U-shaped reaction chamber 310. For example, it may comprise a heating wire 332 generating heat by receiving electrical power, a band heater, or the like. The heat supply means 330 which may be the heating wire 332 may be provided in singular or plural numbers linearly along the length direction of the U-shaped reaction chamber 310, or may be spirally wound around the U-shaped reaction chamber. Also, as shown in the figure, the heat supply means 330 may be configured as an external heating type electric furnace comprising the heating wire 332 buried in a thermally conductive sheath 334. The heat supply means 330 may also be a thermal fluid flowing along the reaction chamber 310 in the form of a double jacket. In the present disclosure, the heat supply means 330 is not limited to the above-described examples but may be in any form as long as it can supply heat to the U-shaped reaction chamber 310.

The reaction unit 300 may further comprise a temperature controller 350. The temperature controller 350 may control the heat supply means 330 such that the temperature inside the U-shaped reaction chamber 310 is maintained appropriately high. For example, the temperature inside the U-shaped reaction chamber 310 may be maintained at 700-1400° C. In addition, the U-shaped reaction chamber 310 may be maintained at normal pressure (atmospheric pressure) or in vacuum state below normal pressure using a decompression chamber (not shown).

The oxygen supply line 400 supplies the oxygen source to the reaction unit 300. In an exemplary embodiment of the present disclosure, the oxygen supply line 400 may comprise a storage tank 410 storing the oxygen source and a transfer pipe 420 transferring the oxygen source stored in the storage tank 410. One end of the transfer pipe 420 may be connected to the storage tank 410 and the other end may be connected to the first straight flow path 312 of the reaction unit 300. Specifically, as shown in FIG. 1, one end of the transfer pipe 420 may be connected to the storage tank 410 and the other end may be connected to the first precursor supply pipe 140.

The storage tank 410 may store one or more selected, for example, from oxygen ($O_2$) and air as the oxygen source. The oxygen supply line 400 may further comprise a mass flow controller (MFC) 405 controlling the supply rate of the oxygen source, and the MFC 405 may be provided on the transfer pipe 420.

The oxygen source may be maintained at appropriate temperature. Specifically, if the oxygen source is supplied to the reaction unit 300 at too low a temperature, the vaporized first precursor produced by the first precursor supply unit 100 may be condensed upon contact with the oxygen source. Thus, the oxygen source may be maintained at a temperature almost the same as that of the vaporized first precursor. For this, the oxygen supply line 400 may further comprise a heat-insulating or heating means. For example, a heat-insulating or heating means may be provided at the storage tank 410 or at the transfer pipe 420. The heat-insulating or heating means may be selected from a thermal insulator, a heating wire, a band heater, etc., as described above. In FIG. 1, a heating wire 426 provided at the transfer pipe 420 is shown as the heating means.

The composite nanoparticles synthesized by the reaction unit 300 are collected by the collection unit 500. That is to say, the composite nanoparticles synthesized in the second straight flow path 316 are introduced to and collected by the collection unit 500 as carried by the carrier gas.

The collection unit 500 is not particularly limited as long as it can collect the synthesized composite nanoparticles. The collection unit 500 may be configured as commonly used ones. The collection unit 500 is not particularly limited as long as it can capture and collect the composite nanoparticles by means of one or methods selected, for example, from a method based on the difference in centrifugal force, a method based on the difference in density, a method based on the difference in molecular size, or the like. The collection unit 500 comprises at least a particle capturing device. More specifically, it may comprise a particle capturing device such as a cyclone capturer, gravitational sedimentation capturer, a filter capturer, etc.

Specifically, the collection unit 500 may comprise a cooling device cooling (condensing) the material discharged from the reaction unit 300 and the particle capturing device capturing and collecting the composite nanoparticles from the discharged material.

Figure 3:
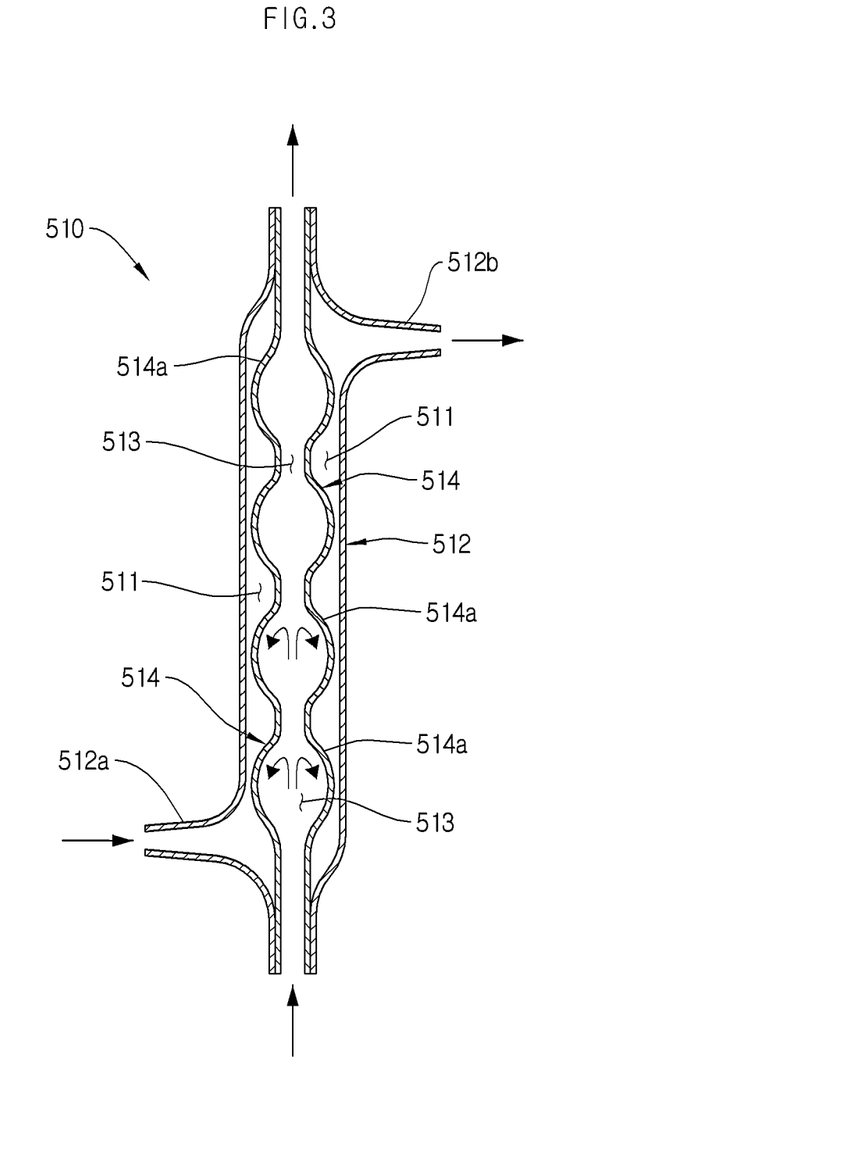
FIG. 3 is a cross-sectional view of a rapid cooling device comprised in an apparatus for manufacturing composite nanoparticles according to an exemplary embodiment of the present disclosure.

Specifically, the cooling device may be one capable of cooling the hot material discharged from the reaction unit 300. It may be a commonly used and may be, for example, a linear cooling pipe based on thermophoresis. However, since the method based on thermophoresis is not efficient in cooling the hot gas comprising the synthesized composite nanoparticles and in cooling the composite nanoparticles, a rapid cooling device comprising a ball-shaped vortex generation unit inside the cooling device may be used. FIG. 3 is a cross-sectional view of such a rapid cooling device 510.

Referring to FIG. 3, the rapid cooling device 510 is a dual pipe comprising an outer pipe 512 and an inner pipe 514 formed inside the outer pipe 512. The outer pipe 512 is provided with a refrigerant inlet 512a and a refrigerant outlet 512b. As shown in FIG. 3, the inner pipe 514 has a fluid flow path 513 through which a hot fluid (a fluid comprising the hot composite nanoparticles) flows and a ball-shaped vortex generation unit 514a to which the introduced fluid collides to generate a vortex is provided. The vortex generation unit 514a may be provided in singular or plural numbers along the length direction of the inner pipe 514.

A refrigerant introduced through the refrigerant inlet 512a cools the hot fluid passing through the fluid flow path 513 of the inner pipe 514 as it flows along a refrigerant flow path 511 formed between the outer pipe 512 and the inner pipe 514. Then, the fluid introduced to the fluid flow path 513 naturally has a vortical flow owing to the vortex generation unit 514a, as shown in FIG. 3. Accordingly, the introduced fluid, i.e. the hot composite nanoparticles, is cooled rapidly and condensation recovery rate is increased.

Specifically, since the fluid introduced to the inner pipe 514 has a vortical flow owing to the ball-shaped vortex generation unit 514a, contact time with the wall of the inner pipe 514 (i.e., contact time with the refrigerant) is increased. Also, the introduced fluid is brought to contact with the refrigerant with a large contact area by the vortex generation unit 514a. That is to say, since the vortex generation unit 514a is ball-shaped as shown in FIG. 3, it increases the contact area of the fluid with the refrigerant. Accordingly, the hot composite nanoparticles are effectively cooled rapidly in short time.

The collection unit 500 may comprise the rapid cooling device 510 in singular or plural numbers. That is to say, the rapid cooling device 510 may be used either in singular number or serially in plural numbers. The length of the rapid cooling device 510 is not particularly limited. The particle capturing device is provided at the end of the rapid cooling device 510. The particle capturing device is not particularly limited as long as it can capture and collect the composite nanoparticles from the discharged material cooled (condensed) by the rapid cooling device 510. As described above, the particle capturing device may be selected from a cyclone capturer using centrifugal force, a gravitational sedimentation capturer using the difference in density, a filter capturer, or the like, but is not limited thereto.

Hereinafter, a method for manufacturing composite nanoparticles according to the present disclosure will be described.

A method for manufacturing composite nanoparticles according to the present disclosure comprises a vaporization operation, a reaction operation and a collection operation. These operations occur continuously. Specifically, the apparatus according to the present disclosure described above is used in the method for manufacturing composite nanoparticles according to the present disclosure. The respective operations will be described below.

Vaporization Operation

First, a first precursor and a second precursor are separately vaporized to produce vapors of the precursors. The vaporization may be carried out by the supply units 100, 200 of the apparatus described above. Specifically, a vaporized first precursor is produced by the first precursor supply unit 100 and a vaporized second precursor is produced by the second precursor supply unit 200. In the present disclosure, the vaporization (and vapor) does not necessarily mean a phase transition of the precursor from a liquid (or solid) phase to a complete gas phase, but comprises atomization to such an extent that boiling can occur.

In the present disclosure, the first precursor and the second precursor are different materials and are not particularly limited, as described above. As described earlier, the first precursor and the second precursor may be selected from a metal, a metal salt, an organometal, an inorganic material, an organic-inorganic hybrid material, etc. Hereinafter, a case wherein a titanium precursor is used as the first precursor and a manganese precursor is used as the second precursor will be described as an example.

The titanium precursor is not particularly limited as long as it is a compound containing titanium (Ti) in the molecule. The titanium precursor may further contain an oxygen (O) atom in the molecule in addition to titanium (Ti). The titanium precursor may be selected, for example, from a titanium salt, an organotitanium compound, etc., although not being limited thereto. The titanium salt may be, for example, titanium tetrachloride ($TiCl_4$). Specifically, the titanium precursor may be selected from an organotitanium compound such as titanium alkoxide.

For example, the titanium precursor may be one or more titanium alkoxide selected from a group consisting of titanium tetramethoxide, titanium tetraethoxide, titanium tetra-n-propoxide, titanium tetraisopropoxide, titanium tetra-n-butoxide, etc. Specifically, titanium tetra-iso-propoxide (TTIP; $Ti[OCH(CH_3)_2]_4$), etc. may be usefully used among them.

The manganese precursor is not particularly limited as long as it is a compound containing manganese (Mn) in the molecule. The manganese precursor may further contain an oxygen (O) atom in the molecule in addition to manganese (Mn). For example, the manganese precursor may be one or more selected from a manganese salt, an organomanganese compound, or the like, although not being particularly limited thereto. The manganese salt may be, for example, manganese chloride ($MnCl_2$), manganese nitrate ($Mn(NO_3)_2$), etc. And, the organomanganese compound may be one or more selected from a group consisting of manganese acetate, manganese acetylacetonate, manganese carbonyl and hydrates thereof. Specifically, manganese carbonyl ($Mn_2(CO)_{10}$), manganese acetate ($Mn(CH_3COO)_2$) and hydrates thereof ($Mn(CH_3COO)_2.4H_2O$, $Mn_2(CO)_{10}.4H_2O$) may be used among them.

In the vaporization operation, the precursors, i.e. the titanium precursor (first precursor) and the manganese precursor (second precursor), are vaporized (or atomized) so as to ensure good reaction activity in the reaction unit 300. If the precursors are supplied to the reaction unit 300 as hot liquid without being vaporized (or atomized), yield (synthesis efficiency) of composite nanoparticles (manganese oxide-titania nanoparticles) may decrease and particle characteristics (particle size, dispersity, etc.) may be poor.

The vaporization operation is not particularly limited as long as the first precursor and the second precursor can be heated to an appropriate temperature and vaporized (or atomized). For example, the precursors may be heated to 50-200° C. and vaporized (or atomized). For example, when an organotitanium compound (e.g., titanium alkoxide) is used as the titanium precursor (first precursor), the precursor may be vaporized by heating to 80-110° C. considering its boiling point. And, when an organomanganese compound (e.g., manganese carbonyl) is used as the manganese precursor (second precursor), it may be vaporized by heating to 90-120° C. considering its boiling point. That is to say, the temperature controllers 180, 280 of the supply units 100, 200 may control the temperature of the bubblers 122, 222 at the above-described ranges. If the temperature is too low, synthesis efficiency (yield) of the nanoparticles may decrease. And, if the temperature is too high, particle characteristics of the synthesized composite nanoparticles may be poor (e.g., particle size may be too large).

Reaction Operation

The vaporized precursors, i.e. the vaporized first precursor (titanium precursor) and the second precursor (manganese precursor) are reacted. The vaporized precursors are supplied to the U-shaped reaction chamber 310 through separate lines so as to prevent aggregation. That is to say, in the reaction operation, the U-shaped reaction chamber 310 according to the present disclosure having the first straight flow path 312, the curved flow path 314 communicating with the first straight flow path 312 and the second straight flow path 316 communicating with the curved flow path 314 is used.

Specifically, the reaction operation proceeds in the reaction unit 300 as shown in FIG. 1 and FIG. 2. More specifically, the vaporized first precursor (titanium precursor) is supplied to the first straight flow path 312 of the reaction unit 300 to produce nanoparticles of the first precursor (titanium precursor) first. Then, the vaporized second precursor (manganese precursor) is supplied to the second precursor inflow path 320 of the reaction unit 300 so that it joins the nanoparticles of the first precursor (titanium precursor) in the second straight flow path 316 and reaction occurs.

In accordance with the present disclosure, interparticle aggregation is prevented since the reaction occurs in different stages using the U-shaped reaction chamber 310. That is to say, if the vaporized precursors are reacted by supplying them simultaneously as in the existing method, interparticle aggregation cannot be avoided. However, if the nanoparticles of the first precursor (titanium precursor) are produced first in the first straight flow path 312 and then the vaporized second precursor (manganese precursor) is joined in the second straight flow path 316 according to the present disclosure, the aggregation phenomenon can be prevented or significantly reduced.

Also, since the flow direction of the nanoparticles of the first precursor (titanium precursor) becomes the same as that of the vaporized second precursor (manganese precursor) at the joining portion P by the curved flow path 314, production efficiency of the composite nanoparticles in the second straight flow path 316 is improved.

In the reaction operation, an oxygen source may be supplied to the reaction unit 300 together with the vaporized precursors. The oxygen source may be supplied to carry or protect the vaporized precursors depending on the identity of the desired final product (composite nanoparticles).

Specifically, if the desired composite nanoparticles are oxide-based composite nanoparticles, the oxygen source may be supplied as an oxidizing agent that reacts with the metal components (e.g., Ti, Mn, etc.) of the vaporized precursors to form oxides (e.g., titania, manganese oxide, etc.). Also, the oxygen source may be supplied together with the vaporized precursors so as to carry the vaporized precursors, i.e. as a carrier of the vaporized precursors. The flow volume and flow rate of the vaporized precursors may be controlled by the supply rate of the oxygen source. In addition, the oxygen source may be supplied to protect the vaporized precursors from the components that may negatively affect the particle synthesis in the U-shaped reaction chamber 310 (e.g., reactive gas introduced from outside).

For example, the oxygen source may be supplied to the first straight flow path 312 together with the vaporized first precursor (titanium precursor). As described above, the oxygen source may be supplied from the oxygen supply line 400. The oxygen source is not particularly limited as long as it contains an oxygen atom (O). For example, oxygen ($O_2$) or air may be used as described above. When a gas such as compressed air is used as the oxygen source, it may also serve to carry the vaporized precursors.

When the vaporized precursors (vaporized titanium precursor and manganese precursor) are supplied to the reaction unit 300, they may be supplied together with a carrier gas. As described earlier, the carrier gas serves as a carrier and may be one or more gas selected from a group consisting of argon (Ar), nitrogen ($N_2$), helium (He), oxygen ($O_2$) and air. Specifically, the carrier gas may be an inert gas not reacting with the vaporized precursors. For example, it may be one or more selected from argon (Ar), nitrogen ($N_2$) and helium (He). As described above, the carrier gas may be supplied from the carrier gas injection lines 160, 260.

Reaction temperature in the reaction operation may be different depending on the identity of the precursors. For example, the reaction temperature may be 700-1400° C. Specifically, the temperature inside the U-shaped reaction chamber 310 may be maintained at 700-1400° C. by the heat supply means 330. Although the temperature may be different depending on the identity of the precursors, if the reaction temperature is below 700° C., yield (synthesis efficiency) of the composite nanoparticles may decrease because pyrolysis of the precursors and crystallization (synthesis) of the composite nanoparticles may be difficult. And, if the reaction temperature is above 1400° C., particle size may increase and, for titania, phase transition may occur from the anatase phase to the rutile phase. Accordingly, the reaction temperature may be maintained above 800° C., more specifically at 800-1200° C.

Collection Operation

Next, the composite nanoparticles synthesized in the reaction operation are collected. The synthesized composite nanoparticles may be collected according to variously methods commonly used in the art. For example, a method using centrifugal force, a method using the difference in density (gravity), a method using the difference in molecular size, or the like may be used in the collection operation. The collection operation may be performed using the collection unit 500 of the apparatus described above.

The material (fluid) discharged from the reaction unit 300 comprises the target composite nanoparticles as well as hot gas (e.g., carrier gas) and organic materials produced from pyrolysis of the precursors, which are gases maintained at high temperature. To separate and remove the gaseous materials, the collection operation may comprise a cooling operation. That is to say, the collection operation may comprise a cooling operation of cooling the materials produced in the reaction operation and a recovery operation of recovering the composite nanoparticles from the cooled materials. The cooling operation may be performed using the cooling device described above, specifically the rapid cooling device 510 described referring to FIG. 3. That is to say, the rapid cooling device 510 having the vortex generation unit 514a provided at the fluid flow path 513 may be used in the cooling operation. And, the recovery operation may be performed using the particle capturing device as described above.

As described, in accordance with the present disclosure, interparticle aggregation is prevented since the composite nanoparticles are synthesized in different stages using the U-shaped reaction chamber 310. And, composite nanoparticles of uniform size and high dispersity, which have a particle size of 20 nm or smaller, specifically several nanometers or smaller, may be manufactured easily through a simple process. In particular, high specific surface area is obtained owing to lack of aggregation and high dispersity. Moreover, large-scale production is possible since the associated operations are few, continuous and accomplished in short time. In addition, the process is cost-effective since the yield (recovery rate) is high and no additional apparatus is required.

Since the composite nanoparticles manufactured according to the present disclosure have ultrafine size and high specific surface area, they have increased activity and may provide superior degradability and adsorption efficiency when used, for example, as a catalyst for degrading organic compounds or as an adsorbent.

The composite nanoparticles manufactured according to the present disclosure may be used in various fields comprising, for example, ecology, energy, electronics, biology, and so forth. For example, they may be usefully used as a catalyst for degrading organic compounds (e.g., VOCs) or as an adsorbent for removing pollutants.

The examples (and experiments) will now be described. The following examples (and experiments) are for illustrative purposes only and not intended to limit the scope of the present disclosure.

Example

Manganese oxide-titania nanoparticles are synthesized as follows using the apparatus shown in FIG. 1.

Titanium tetraisopropoxide (TTIP; Ti[OCH($CH_3$)$_2$]$_4$, Kanto Chemical Co. Inc., Japan) is supplied as a $TiO_2$ precursor from the first precursor supply unit 100 of the apparatus shown in FIG. 1 to the bubbler 122 and vaporized by maintaining at 95° C. using an oil bath. Then, the vaporized $TiO_2$ precursor is supplied to the first straight flow path 312 of the U-shaped reaction chamber 310 by injecting argon (Ar) gas at a flow rate of 0.7 L/min to the first precursor supply unit 100 as a carrier gas. Also, air is injected at 7 L/min into the U-shaped reaction chamber 310.

At the same time, manganese carbonyl ($Mn_2(CO)_{10}$, Aldrich, 98 wt %) is supplied from the second precursor supply unit 200 to the bubbler 222 as a $MnO_x$ precursor and vaporized by maintaining at 105° C. using an oil bath. Then, the vaporized $MnO_x$ precursor is supplied to the inflow path 320 at the opposite side by injecting argon (Ar) gas at a flow rate of 0.2 L/min to the second precursor supply unit 200 as a carrier gas, such that it joins the vaporized $TiO_2$ precursor in the second straight flow path 316 of the U-shaped reaction chamber 310.

The U-shaped reaction chamber 310 is maintained at 900° C. by external heating, such that $TiO_2$ nanoparticles are produced in the first straight flow path 312, which are passed through the curved flow path 314 and joined with the vaporized $MnO_x$ precursor in the second straight flow path 316 so as to synthesize manganese oxide-titania nanoparticles.

Figure 4:
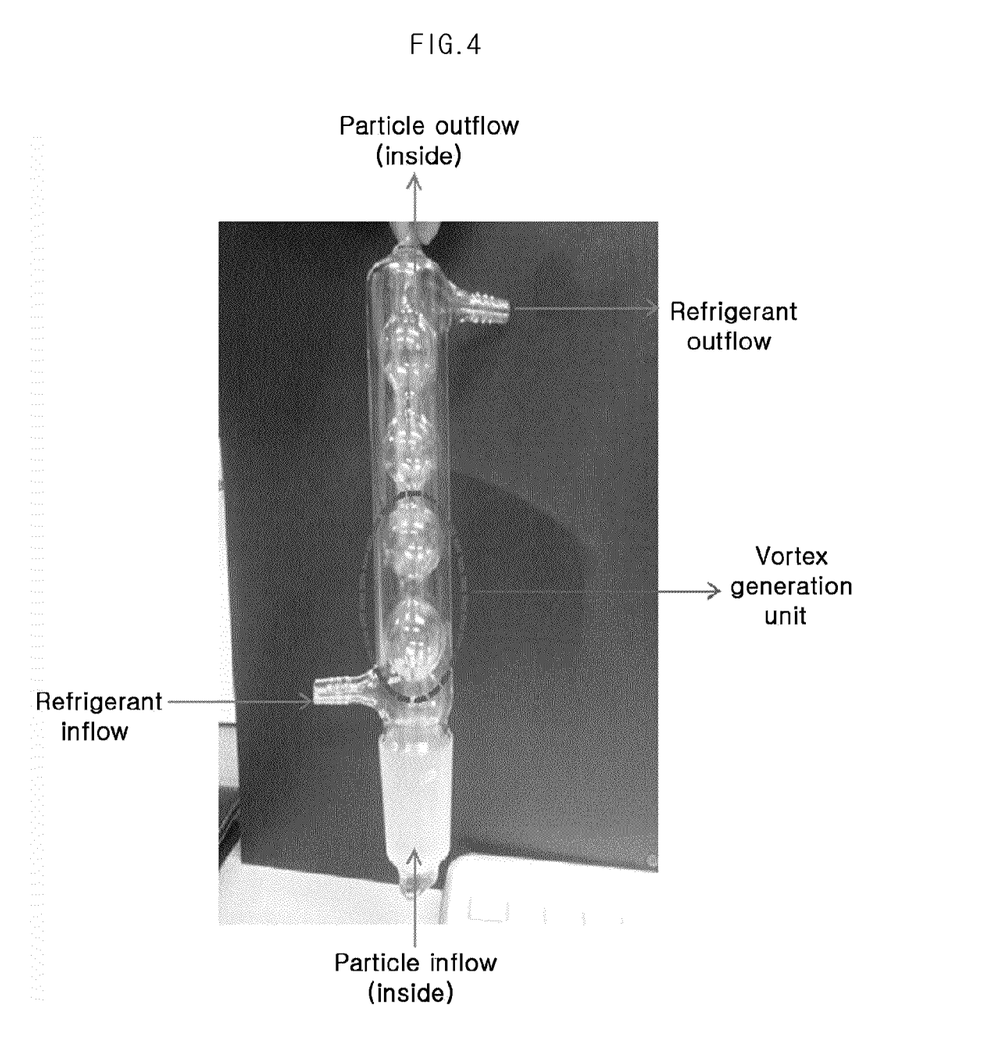
FIG. 4 is a photographic image of a rapid cooling device according to an exemplary embodiment of the present disclosure.
Figure 5:
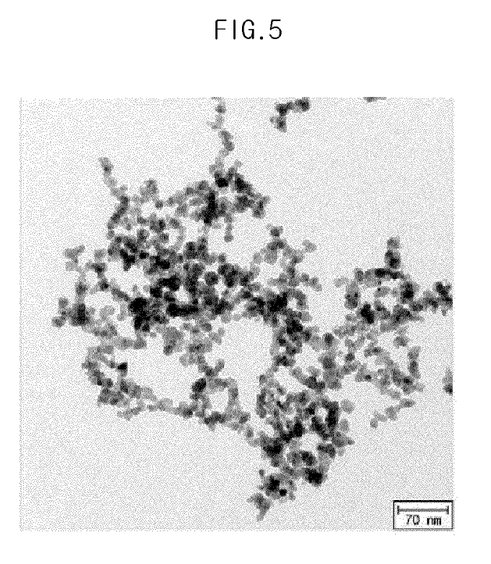
FIG. 5 is a transmission electron microscopic (TEM) image of composite (manganese oxide-titania) nanoparticles manufactured according to an exemplary embodiment of the present disclosure (gas phase synthesis)

A fluid comprising thus synthesized hot composite nanoparticles is cooled to 10° C. using the rapid cooling device 510 comprising the ball-shaped vortex generation unit 514a. After the cooling, the manganese oxide-titania nanoparticles are captured and collected using a cyclone particle capturing device. FIG. 4 is a photographic image of the rapid cooling device 510 used in this example. And, FIG. 5 is a transmission electron microscopic (TEM) image of the composite nanoparticles (manganese oxide-titania nanoparticles) manufactured in this example.

Comparative Example

For comparison of characteristics with the composite nanoparticles manufactured in Example, manganese oxide-titania nanoparticles are manufactured according to the commonly employed solution method as follows.

Figure 6:
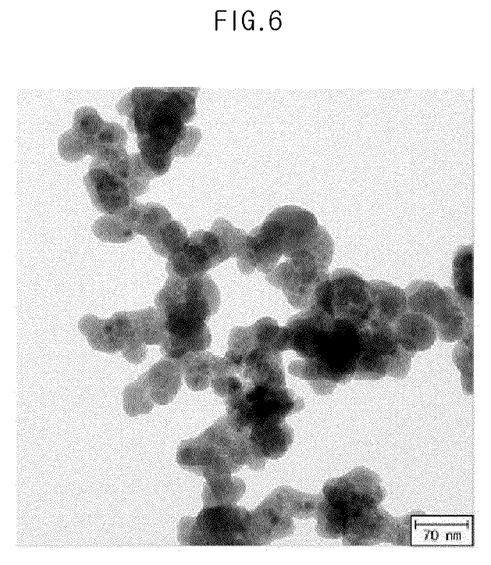
FIG. 6 is a TEM image of composite (manganese oxide-titania) nanoparticles manufactured according to the existing method (wet synthesis).

An aqueous solution of $Mn(CH_3COO)_2 \cdot 4H_2O$ (Aldrich, 99.99 wt %), a manganese precursor, is mixed with commercially available $TiO_2$ particles (Degussa, P-25) for 2 hours. Then, after dehumidifying in an evaporator at 50° C., the mixture is dried for 10 hours in a drying furnace. After the drying, synthesis is performed in an electric furnace maintained at 500° C. FIG. 6 is a TEM image of the composite nanoparticles (manganese oxide-titania nanoparticles) manufactured according in Comparative Example (wet synthesis).

Particle size distribution and specific surface area of the composite nanoparticles manufactured in Example and Comparative Example are analyzed. The result is given in Table 1.

TABLE 1

<Particle size distribution and specific surface area of composite nanoparticles>

| | Synthesis method | Particle size distribution | Specific surface area |
|---|---|---|---|
| Example | Gas phase synthesis using U-shaped reaction chamber | 5-10 nm | $\geq 150\ m^2/g$ |
| Comparative Example | Wet synthesis | 30-40 nm | $\sim 40\ m^2/g$ |

As seen from FIG. 5 and FIG. 6, the composite nanoparticles manufactured in Example according to the present disclosure (gas phase synthesis) show high dispersity and uniform size without interparticle aggregation (FIG. 5). In contrast, the composite nanoparticles manufactured in Comparative Example according to the existing method (wet synthesis) show interparticle aggregation and decreased dispersity as compared to those of Example (FIG. 6).

And, as seen from Table 1, the composite nanoparticles manufactured in Comparative Example according to the existing method (wet synthesis) have a relatively large particle size (diameter) of 30-40 nm and a low specific surface area of about 40 $m^2/g$.

In contrast, the composite nanoparticles manufactured in Example according to the present disclosure (gas phase synthesis) have an ultrafine particle size (diameter) of 5-10 nm and a high specific surface area of 150 $m^2/g$ or greater.

As demonstrated in the foregoing examples, when the composite nanoparticles are manufactured by gas phase synthesis by supplying the precursors in different stages using the U-shaped reaction chamber according to the present disclosure, aggregation can be prevented and uniform size and high dispersity can be achieved. Further, the composite nanoparticles having an ultrafine particle size of several nanometers and having a specific surface area can be manufactured easily.

What is claimed is:

1. An apparatus for manufacturing composite nanoparticles, comprising:
    a first precursor supply unit vaporizing a first precursor and supplying it to a reaction unit;
    a second precursor supply unit vaporizing a second precursor and supplying it to the reaction unit;
    the reaction unit producing composite nanoparticles by reacting the vaporized first precursor with the vaporized second precursor;
    an oxygen supply line supplying an oxygen source to the reaction unit; and
    a collection unit collecting the composite nanoparticles produced by the reaction unit,
    wherein the reaction unit comprises:
    a U-shaped reaction chamber having: a first straight flow path wherein nanoparticles are produced from the vaporized first precursor supplied from the first precursor supply unit; a curved flow path which is communicated with the first straight flow path and allows the nanoparticles produced from the first straight flow path to be introduced to a second straight flow path with a curved flow; and the second straight flow path which is communicated with the curved flow path and wherein the composite nanoparticles are produced from the reaction of the nanoparticles of the first precursor introduced from the curved flow path and the vaporized second precursor supplied from the second precursor supply unit;
    a second precursor inflow path introducing the vaporized second precursor supplied from the second precursor supply unit to the second straight flow path of the U-shaped reaction chamber; and
    a heat supply means supplying heat to the U-shaped reaction chamber.

2. The apparatus for manufacturing composite nanoparticles according to claim 1, wherein the first precursor supply unit comprises:
    a first vaporization tank vaporizing the first precursor;
    a first precursor supply pipe transferring and supplying the vaporized first precursor vaporized by the first vaporization tank to the first straight flow path; and
    a carrier gas injection line injecting a carrier gas to the first vaporization tank.

3. The apparatus for manufacturing composite nanoparticles according to claim 2, wherein the first vaporization tank comprises a bubbler wherein the first precursor is held and vaporized and an oil bath which supplies heat to the bubbler.

4. The apparatus for manufacturing composite nanoparticles according to claim 1, wherein the second precursor supply unit comprises:
    a second vaporization tank vaporizing the second precursor;
    a second precursor supply pipe transferring and supplying the vaporized second precursor vaporized by the second vaporization tank to the second straight flow path; and
    a carrier gas injection line injecting a carrier gas to the second vaporization tank.

5. The apparatus for manufacturing composite nanoparticles according to claim 4, wherein the second vaporization tank comprises a bubbler wherein the second precursor is held and vaporized and an oil bath which supplies heat to the bubbler.

6. The apparatus for manufacturing composite nanoparticles according to claim 2, wherein the oxygen supply line comprises:
    a storage tank storing the oxygen source; and
    a transfer pipe transferring the oxygen source stored in the storage tank,
    wherein the transfer pipe is connected to the first precursor supply pipe.

7. The apparatus for manufacturing composite nanoparticles according to claim 1, wherein the inner diameter of the second precursor inflow path is the same as that of the second straight flow path.

8. The apparatus for manufacturing composite nanoparticles according to claim 1, wherein the collection unit comprises a cooling device having a vortex generation unit at a fluid flow path where the composite nanoparticles pass through.

* * * * *